US006782144B2

United States Patent
Bellavita et al.

(10) Patent No.: US 6,782,144 B2
(45) Date of Patent: Aug. 24, 2004

(54) DOCUMENT SCANNER, SYSTEM AND METHOD

(75) Inventors: Jorge Luis Bellavita, La Plata (AR); Jorge Pablo Pucci, La Plata (AR)

(73) Assignee: Multiscan Corp., Miami, FL (US)

( * ) Notice: Subject to any disclaimer, the term of this patent is extended or adjusted under 35 U.S.C. 154(b) by 540 days.

(21) Appl. No.: 09/804,272

(22) Filed: Mar. 12, 2001

(65) Prior Publication Data

US 2002/0141660 A1 Oct. 3, 2002

(51) Int. Cl.$^7$ ............................................. G06K 9/03
(52) U.S. Cl. .................... 382/310; 382/187; 382/311
(58) Field of Search ............................ 382/112, 135, 382/137–140, 173, 175–179, 182–183, 185–187, 218, 275, 282–283, 291–292, 296, 309–311; 358/1–15, 453, 462, 463; 715/530–531

(56) References Cited

U.S. PATENT DOCUMENTS

| | | | |
|---|---|---|---|
| 5,243,149 A | | 9/1993 | Comerford et al. ............ 178/18 |
| 5,317,646 A | * | 5/1994 | Sang et al. ................. 382/175 |
| 5,392,447 A | | 2/1995 | Schlack et al. ............. 395/800 |
| 5,499,108 A | | 3/1996 | Cotte et al. ................. 358/400 |
| 5,966,473 A | * | 10/1999 | Takahashi et al. .......... 382/292 |
| 5,970,170 A | | 10/1999 | Kadashevich et al. ...... 382/187 |
| 6,028,970 A | * | 2/2000 | DiPiazza et al. ............ 382/309 |
| 6,134,338 A | | 10/2000 | Solberg et al. ............. 382/113 |

OTHER PUBLICATIONS

Buttarazzi, "NNORC—A Neural Network for the Optical Character Recognition", Jun. 27—Jul. 2, 1994, IEEE World Congress on Computational Intelligence, 1994 IEEE International Conference on, vol. 6, pp. 4061—4065a.*

* cited by examiner

Primary Examiner—Timothy M. Johnson
(74) Attorney, Agent, or Firm—Robert C. Kain, Jr.; Fleit Kain

(57) ABSTRACT

The document scanner system and method operates in conjunction with a document imprinted with data in a plurality of data image fields and a plurality of form documents adapted to have data imprinted thereon. The system output to a communications port is a delimited string of decoded characters. The method scans to obtain positional information of data fields or accepts topological form input by the operator. The operator identifies data descriptors, e.g. field size, data type, etc. The system and method scans the document imprinted with data and captures an image thereof. The scanned input document image is compared with the stored forms (particularly the stored data field descriptors, e.g., positional information, and data type). The system selects a stored form, extracts the data from each field, decodes or calculates the data, and validates the data and stores the decoded/calculated data in the output sequence.

16 Claims, 3 Drawing Sheets

DOCUMENT SCANNER, SYSTEM AND METHOD

FIELD OF THE INVENTION

The present invention relates to a document scanner for scanning, locating and deciphering data in data fields on one or more documents imprinted with data, a computer system therefor and a method therefor.

DESCRIPTION OF THE RELATED ART

Although document scanners are relatively widely available (those scanners obtaining an image of a document) and there are computer software programs which read the information from the scanned image of the document and decipher and extract information from the document (such as OCR or optical character reader programs), there is a need for a stand alone, computer based unit which scans a document imprinted with data, locates the data on the document, deciphers the data and outputs the data in a common format to other computer systems.

U.S. Pat. No. 5,499,108 to Cotte et al. discloses a Document-Driven Scanning Input Device which communicates with a computer via an RS232 interface. Col. 4, line 54. In FIG. 12, and beginning at col. 10, line 29, Cotte '108 discloses the use of an input device 214 which sends information codes via an RS232 cable to host computer 210. In one embodiment, the host computer 210 recognizes the codes generated by input device 214 and processes the information in accordance with the code. This processing may include faxing the scanned image, sending the image in an e-mail message or performing word processing on the image. Col. 10, line 47, line 48, and line 54. In an alternate embodiment (col. 10, line 54), input device 214 analyzes the data stream from the scanned document to locate the code on the document. In one embodiment, the code on the document is a special symbol which input device 214 recognizes. Col. 11, lines 24–30. A graphic symbol may be used. Col. 11, lines 34–35. The input device 214 may be trained with symbol recognition software to recognize a particular symbol. Col. 11, lines 44–46. Predefined or predetermined graphic signals can be printed on the document to be scanned. Col. 11, lines 53–55. FIGS. 26–28 show graphic symbols identified in a "hot zone" or data field. These graphic symbols are recognized by input device 214. Particularly, reference point 406 provides an index point for the symbol recognition and the recognition software captures data commands in hot zone 404 (FIG. 26) or hot zone 404 in (FIG. 27) or hot zone 410 in FIG. 28. See col. 12, lines 5–20.

Cotte '108 also discloses the use of a preprinted document form for each type of operation. Col. 13, lines 26–28. Hand drawn symbols are also recognized by input device 214. Col. 13, lines 38–42. "FIG. 16 represents the classes of embodiments where the command symbols 243 and 245 are placed either in hot zone which are not on the top of the page or randomly placed on the page. Recognition of symbols where random placement on the page is practiced is more easily performed when formalized symbols or stickers are used which the recognition software has already been trained to recognize." Col. 13, lines 54–61. After the input device 214 recognizes the symbol, the input device then compares the captured command and compares it to a list of previously stored symbols in order to decode the command. Col. 14, lines 7–12. Hence, Cotte '108 decodes the scanned data field. "The input device software then generates the appropriate commands to send to the host software package invoked by the command symbol to cause the host software so invoked to appropriately process the data received from the input device." Col. 14, lines 30–34.

Cotte '108 describes FIG. 13A as obtaining a scanned image data which is compressed by the input device. Col. 14, line 52. FIG. 13B is described at col. 15, lines 8–55 as a routine wherein the input device scans the document, generates a command to the host computer and the user on the host computer then selects a menu option for that scanned image. Cotte '108 seems to output the scanned item as an image file rather than as a data file.

U.S. Pat. No. 5,243,149 to Comerford et al. discloses a Method and Apparatus for Improving the Paper Interface to Computing Systems. The two major components utilized in Comerford '149 include a digitizing tablet 10 and a hand held scanner 15. See FIGS. 1–2; Col. 5, lines 9–13. The document is scanned and stored in an ordinary manner. Col. 7, lines 7–12. A control document is also prepared such that the control document links the scanned document file with other files such as an annotation file. The scanned image files and the files containing electronic representation of handwritten notes (an annotation file) are processed at a work station after being downloaded from the notepad to the work station. The analysis is conducted with a character recognition software and with handwriting recognition software. Col. 9, lines 7–20.

U.S. Pat. No. 5,392,447 to Schlack et al. discloses an Image-Based Electronic Pocket Organizer with Integral Scanning. In this computerized pocket organizer or personal data assistant, the operator interacts with the computer system through a touch sensitive electronic display panel 14 based upon various overlay screens or windows. The operator interacts with the windows by touching the screen to perform various functions such as data entry, hand printed text entry, virtual alpha numeric keyboard operations, organizer navigational operations, among others. Col. 3, lines 60–69. After a document is scanned, the electronic file is processed by an optical character recognition system or a photo or image processing system. Col. 6, lines 48–57. To process business cards, the business card is scanned by the scanning unit and character recognition software is applied to this electronic scanned image data to identify the text information therein. Col. 8, lines 37–44. A relational database is utilized to link various information and certain data fields. However, with respect to the input of business card information, the operator is prompted at the initiation of the scanned operation to identify and attach a file tag containing one or more of the linking fields to the image being scanned. In this manner, each scanned image can be easily identified and cross-referenced with tagged data files. Col. 9, lines 51–62. With respect to medical insurance information which is scanned directly from the patient's medical card, the system performs a text identification routine (OCR) on the image bit map of the scanned medical card to identify areas of the bit map that contain text information. "A box is drawn around each of the areas that are determined to contain text information." The system then decodes the image and extracts text information in the box. "The operator can then transfer the identified text data within selected boxes into the text information file by touching a selected box to fill in a template field that is overlayed on the display. The template field continues to prompt the user to select a box for each of the fields in the text information file." Col. 10, lines 26–43.

U.S. Pat. No. 6,134,338 to Solberg et al. discloses a Computer System for Converting Documents Bearing Symbols and Alphanumeric Text. Solberg '338 states that it is particularly well suited to converting a raster image of a scanned hard copy source document bearing a drawing view of the three dimensional object, symbols and alphanumeric text relating to height, width, length, depth and angle of edges of the three dimensional object into mathematically accurate vector computer drawing files which files are based on the symbols in alphanumeric text scanned from the source document. The automated system includes the use of commercially available text recognition software for automatic conversion of raster text, including handwritten, upper and lower case text, and rotated text into AUTO CAD text strings. Col. 15, lines 47–52. The disclose states that after alphanumeric text has been recognized, the user can edit the resulting ASCII text as necessary. The preset optical character recognition parameters can automatically subject questionable text recognitions to user review. Col. 27, lines 55–59. In step 4.3 (FIG. 1A), alphanumeric text 180 and floating viewport 242 is recognized. Col. 28, lines 6–8. If necessary, the user can edit the text to correct OCR recognition errors. Col. 28, lines 12–14. In step 4.3 and 4.4, the OCR program creates a text file obtained from the scanned document. Col. 29, lines 57–60. See also FIG. 2 and step 4.

U.S. Pat. No. 5,970,170 to Kadashevich et al. discloses a Character Recognition System for Scanned and Real Time Handwritten Characters. The disclosure in the Kadashevich '170 relates to detecting and decoding handwritten characters including an image processor connecting to a document scanner which receives the scanned image of a previously created document and generating one or more ordered cluster arrays. These ordered cluster arrays contain spatially ordered coordinate arrays of skeletal image arcs representing handwritten characters. The handwritten characters are processed using several techniques. Kadashevich '170 does not seem to show the use of applying one of a plurality of forms to a scanned image, extracting data based on the forms and the scanned image, validating the data and that outputting the data is a delimited file.

The prior references do not show a single, computerized, unitary device which scans a number of documents imprinted with data, compares each document to previously stored form documents, selects one of the form documents, lifts or extracts the data from the input document having imprinted data thereon, and decodes that data based upon previously stored data characteristics. Further, the prior art devices do not show, in a single, unitary, computer system, extracting the data from the document having imprinted data thereon without regard to orientation of the input document and outputting the decoded data as a delimited string of characters or a delimited data field.

OBJECTS OF THE INVENTION

It is an object of the present invention to provide a document scanner and a system and a method which enables the user to scan a document imprinted with data, extract that data based upon a match between the scanned document and a plurality of form documents, decode the data, disregard misalignment or smudges on the input document image, and output decoded data as a delimited string of decoded characters to a further computerized device via a common computer communications link, all encompassed within a single computerized machine or system.

It is another object of the present invention to provide a document scanner, a system and a method wherein the operator can easily scan a form document, locate the important data fields on that scanned form document, size the data image field, identify data type for that data field, identify the presence or absence of any data validation parameters, identify the presence or absence of any data error reporting and data correction routines or parameters, and identify a data output destination for that decoded data in a delimited string of decoded characters output to a further computer device.

It is another object of the present invention to provide an operator interface for the identification of data field descriptors, those descriptors including positional information for the data field, data field size, data type, data validation, error reporting and correction, and data output destination information.

It is an additional object of the present invention to incorporate the scanning, operator input, identification and storing of data field descriptors, comparison of scanned document image with a plurality of forms, selection of one of the forms, extraction data from a data field, decoding and validating that data, reporting and correcting the data and outputting the decoded data all in a single, stand alone, unitary, computerized system.

SUMMARY OF THE INVENTION

The document scanner, system and method operates in conjunction with a document imprinted with data and a plurality of form documents adapted to have data imprinted thereon. The form document or documents have at least one data image field. Typically, the form document has many data image fields. Ultimately, the document scanner, system and method outputs a delimited string of decoded characters to another computer system via a common computer communications link such as a serial, ethernet, USB, SCSI, parallel interface, etc. The method includes either scanning a form document to obtain positional information of the data field on the form document or inputting topological description for the data image field for the form document. The topological description includes at least positional information for the data field. Typically the operator, in conjunction with an operator interface, identifies data field descriptors for each data field. The data field descriptors include data field size information, data type information, the presence or absence of data validation parameters, the presence or absence of data error reporting and data correction routines or parameters, and data output destination information. The data output destination information locates the decoded data in a certain sequence location in the delimited string of decoded characters output to the further computer system. The document scanner, system and method scans the document imprinted with data and captures an image thereof. The scanned input document image is compared with the stored forms, and particularly the stored data field descriptors utilizing positional, data field size and data type information. The system selects one of the stored forms corresponding to the scanned image. The document scanner, system and method then extracts the data from the scanned image based upon positional information for each data field, decodes the information based upon the data field descriptors, and validates the data (in the presence of data validation parameters) and stores the decoded data. A data error reporting and data correction system, activated in the presence of the data error reporting and correction descriptor, enables the operator to correct any errors ascertained from the extracted and decoded data from the data image fields. The document scanner, system and method outputs, via a compiler, the decoded data as part of the delimited string of decoded characters based upon the data output destination information. The scanner, system and method also includes a deskewing routine which accommodates and corrects for any misalignment in the initially scanned input document with respect to the positional information for each data image field. Further, the system includes a noise reduction system which attenuates smudges or imperfections in the data fields.

BRIEF DESCRIPTION OF THE DRAWINGS

Further objects and advantages of the present invention can be found in the detailed description of the preferred embodiment when taken in conjunction with the accompanying drawings in which.

DETAIL DESCRIPTION OF THE PREFERRED EMBODIMENT

The present invention relates to a document scanner, system and a method for scanning a document (sometimes called herein "an input document") imprinted with data, locating the data on the input document, deciphering the data, and outputting the decoded data as a delimited string of decoded characters to a further computer system via a common computer communications link.

Figure 1:
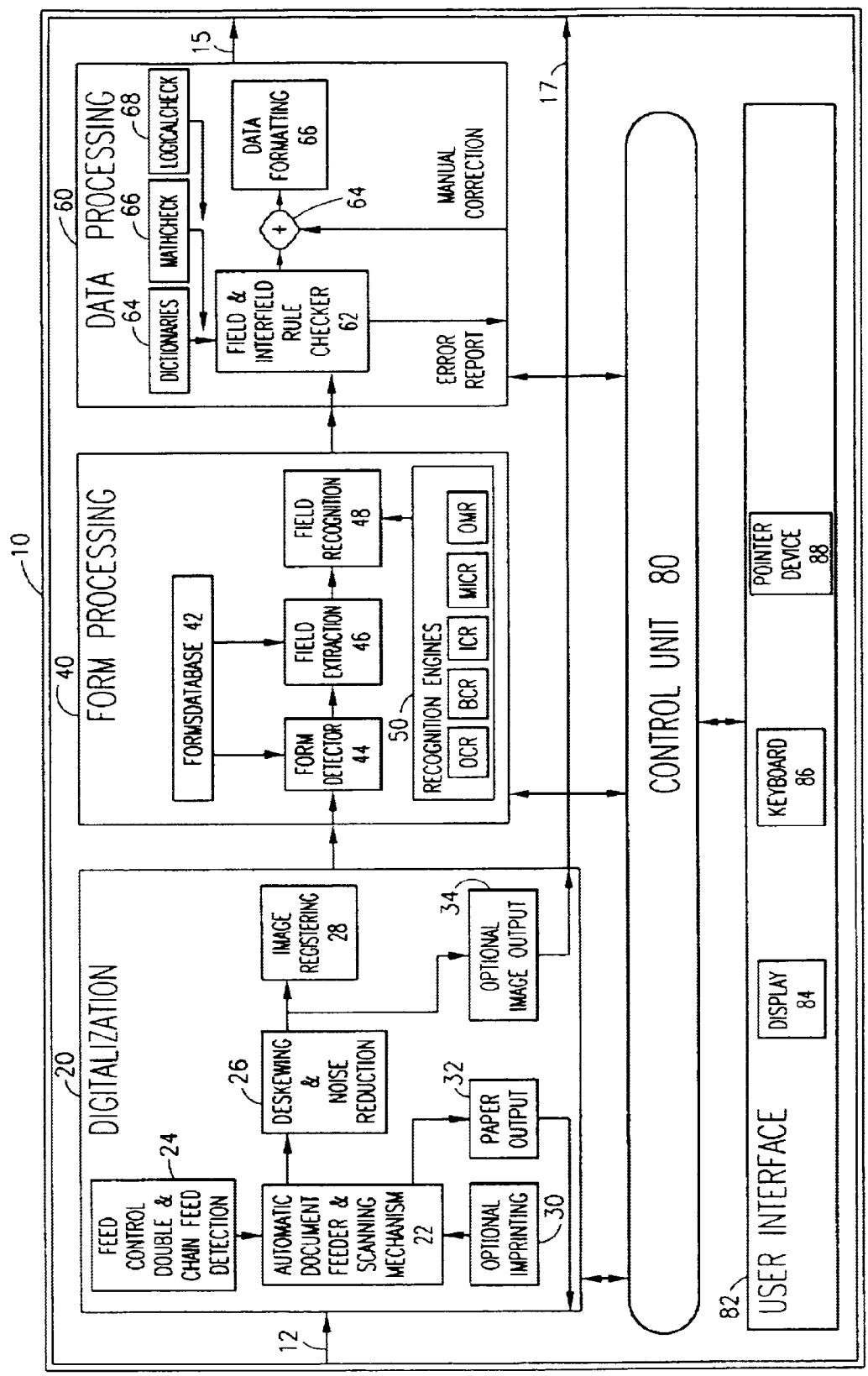
FIG. 1 diagrammatically illustrates the document scanner as both a system chart and as a data processing method.

FIG. 1 diagrammatically shows the unitary, stand alone computerized system 10 and also shows the data flow and processing method for data from the input document. The input document is fed into scanner system 10 as noted by arrow 12 and the ultimate output from scanner system 10 is noted by arrow 15 which output is applied to a common computer communications link or port. Further computerized devices (not shown) are coupled to output port 15. Output port 15 may be configured as shown below.

Output Port Options

Serial
Ethernet
USB
SCSI
Parallel
Etc.

In addition as an option, document scanner 10 can output the scanned image of the input document at port 17. Ports 15 and 17 may be coupled together to form a single port.

The major functional blocks, embodied in both hardware and software in document scanner 10, are illustrated in FIG. 1. Initially, the input document (which can also be a form document) is handled and processed via digitalization unit 20. The other functional units include form processing unit 40, data processing unit 60, control unit 80, and a user interface system 82. User interface system 82 includes display 84, keyboard 86 and pointer device 88 (for example, a mouse, track ball, etc.).

Digitalization unit 20 includes hardware and operative software to provide automatic document feeder and scanning mechanism 22 for the input document. The document feeder and scanning mechanism 22 works under the supervision of feed control, double and chain feed detection 24. The output of automatic document feeder and scanning mechanism is applied to the deskewing and noise reduction module 26. After deskewing and noise reduction (to eliminate misalignment of the scanned image and smudges and imperfections from the scanned input document), the system realigns the scanned image via image registering function 28. The output of deskewing and noise reduction module 26 is fed to the optional image output 34 to optionally provide an output to the optional image output port 17.

Optionally, an optional imprinting module 30 can print on the scanned documents while they are being processed by the automatic document feeder and scanning mechanism 22 and before they reach the paper out stage 32.

Form processing unit 40 maintains a forms database 42 in a computer memory. The forms database provides input to form detector module 44 and field extraction module 46 operates on data fields or data field images in the scanned input document. The output from field extraction module 46 is applied field recognition module 48. Form processing unit 40 includes recognition engines 50. These recognition engines enable the system to match and decode extracted data images from the data fields based upon standardized data formats.

Document scanner 10 can recognize the following data in the positionally located data fields.

Coded Data Table printed letters or numbers
optical marks, ticks, cross-outs (OMR)
handwritten numbers or letters (ICR)
bar codes (linear and 2D) (BCR)
special characters (MICR, OCR-A, OCR-B, F-13B, CMC 7)

MICR is typically magnetic and character recognition formulas (see generally, U.S. Pat. No. 6,183,148); E13B is a font character set established as a standard in certain industries (see generally U.S. Pat. No. 5,729,621); ICR is intelligent character recognition, numeral American and/or European style, which is read either in either free position or in character boxes (for example, see ICR generally in U.S. Pat. No. 5,970,171); OMR represents multiple types of optical marks such as X, tick mark, non-solid hatching marks all of which can be decoded in free positioning fields; and bar code recognition is provided for the following: code 39, code bar, code 2 of 5, code 12 of 5, code 128, UCC 128, code 93, UPC A, UPC E, EAN, Posnet, PDF 417, DATA MATRIX, AZTEC, etc., all in free positions or selected orientation positions.

The output for form processing unit 40 is applied to data processing unit 60. Data processing unit 60 includes data field and interfield rule checker or validator 62 which accepts input from, as necessary, dictionary module 64, mathematics check algorithm 66, logical check algorithm 68 or a semantic rule validator module. Field rule checker and validator 62 may generate an error report send via control unit 80 to display 84. Manual correction is enabled via operator assistance and user interface 82 into a summation or substitution module 65. The output of summation unit 65 is applied to data formatting unit 67. The data formatting unit compiles the decoded data, places the scanned, decoded corrected data and/or calculated data based on rules and decoded data into the proper location in the delimited string of decoded characters output to the further computer system (not shown) via common communications port 15. Optical marks may be calculated based upon known industry standards or formulas. Calculated data is processed in a similar manner as compared with decoded data and the terms, in a general sense, are similar.

Figure 2:
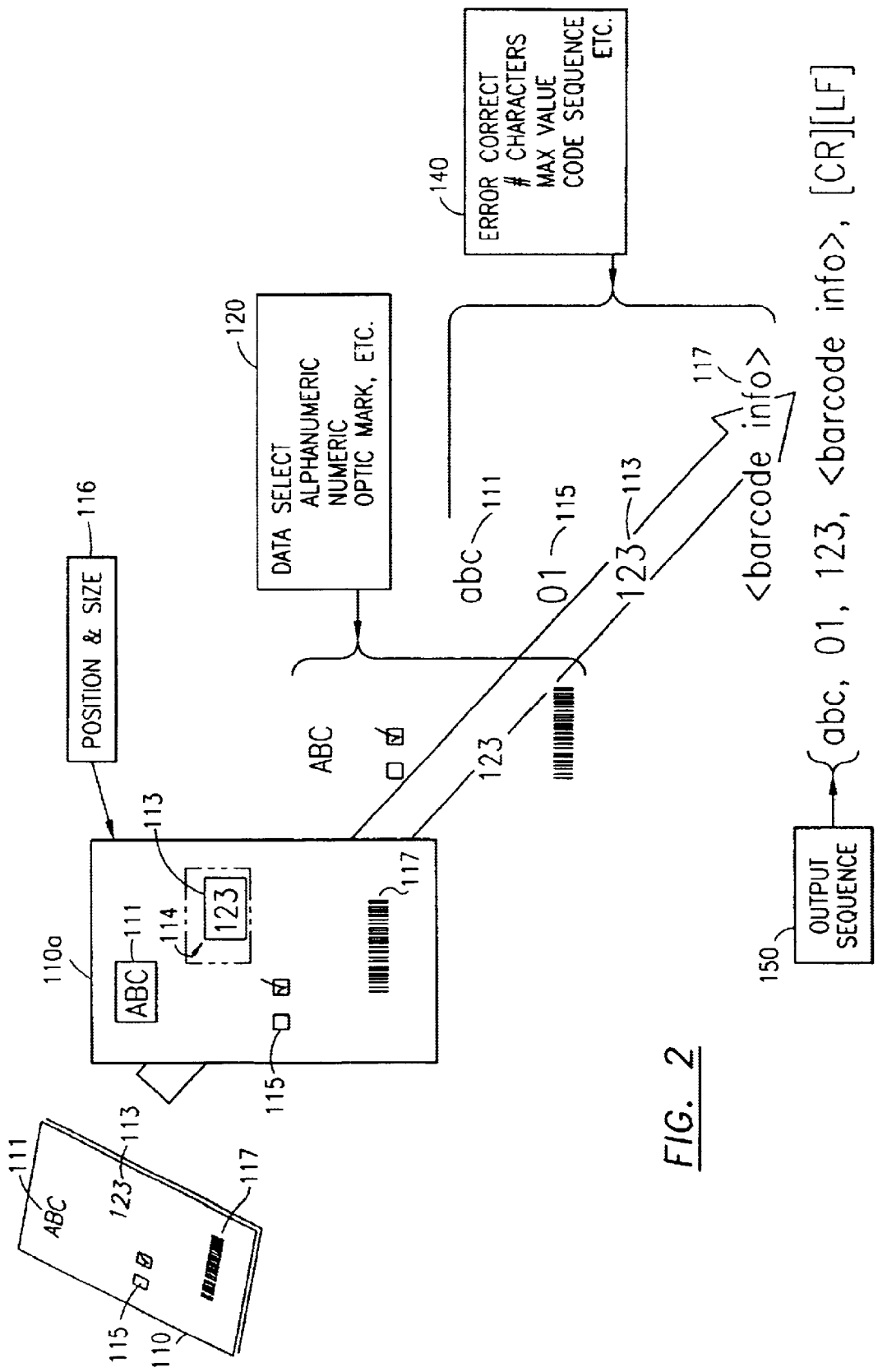
FIG. 2 diagrammatically and graphically illustrates scanning a form document thereby enabling the operator to identify and store data field descriptors for the form document.

FIG. 2 diagrammatically and graphically illustrates the form input system and process flow. There are two mechanisms which the operator may utilize to input form document information into computer system scanner 10. In one methodology, a form document is scanned by scanner system 10. The form document may or may not have imprinted data thereon. The other methodology involves an operator inputting topological descriptions for the data image field into the system. Data is extracted from data fields that are positionally located on an input form document 110. The following Data Field Description Table shows typical data field descriptors for each data field.

Data Field Description positional information
data field size
type of data (or types of data) in field
data properties parameters (dictionary logical check, logical rules, mathematic rules, semantic rules)
error routine and data correction input/output
destination of decoded or calculated data in output file The input form document, in the illustrated embodiment in FIG. 2, includes a plurality of data fields 111, 113, 115 and a bar code data field 117. Input form document 110 is fed into automatic feeder 22 and the feed control detection 24 determines when the entire document has been input. After correcting for imagery positioning in imagery positioning unit 28, an image of the scanned input document is shown on display 84. The display of the scanned image is graphically shown as scanned image 110a in FIG. 2. To identify the useful data from other information on scanned image 110a, the operator provides positional information (e.g., by moving a cursor via pointer 88) by locating data image fields 111 and 113 in relation to a recognized point on the scanned image (e.g., a corner edge or cross-hair mark on the image). Further, the size of the data field is altered by the operator (via pointer 88) in conjunction with data field 113 as shown by the broken lines about data field 113 and particularly arrow 114. The size and positional information for the data fields 115 and 117 have not been completed by the operator in FIG. 2. Position and size function 116 illustrates this feature. Alternatively, the operator may input a simple topographical description including field descriptors to "setup" a form document. The operator may simply input "bottom 25% of scanned document" to identify a positional information of the data field image and select a data type "bar code." This alternative inputs the topographical description of the data fields without utilizing a scanned input from the form document.

Data select function 120 enables the operator to select the type of data for each data field. See Coded Data Table above. Step 140 enables the operator to set the presence or absence of data validation parameters and the presence or absence of data error reporting and data correction. For example, data field 111 has been designated as an "alphabetic" character "case insensitive" field. Field 115 has been designated as an "optical marker" data type and the "check" is converted from an optical tick to a digital value "01."The data descriptor for an optical marker also includes a data output configuration or format. Data field 113 has been classified as to a position subsequent to optical tick data field 115. Data field 117 has been characterized as a bar code information.

Step 150 enables the operator to select the output sequence for the data obtained, extracted and decoded in each data field. The output sequence selected in the illustrated embodiment is field 111, field 115, field 113, field 117 and thereafter followed by delimiting characters CR-LF (carriage return, line feed). As such, the extracted and decoded data from input form document 110 would include an alphabetic character or character string in the first position, a digital value for the optical tick in the second position, a numeric character string in the third position, decoded bar code information in the fourth string, followed by delimiting characters CR-LF. Other delimiting characters may be utilized. Delimiting characters indicate the separation between records or separation between each input document.

In use, scanner system 10 stores a plurality of scanned form documents, each having unique data field descriptors. The data field descriptors include positional information for each data field unique to that form (i.e., relative position to another scannable and identifiable image point), data field size information, data type information, the presence or absence of data validation parameters, the presence or absence of data error reporting and data correction routines, and data output destination information. It may not be necessary for the system 10 to automatically correct or validate decoded data. Hence, data validation parameters and data error reporting and data correction parameters may be omitted. Once a plurality of form documents, represented by at least one data image field for each form document (and preferably a plurality of data image fields and corresponding data field descriptors for each form document) is stored in forms database 42, full operational performance of document scanner 10 can be achieved.

Figure 3:
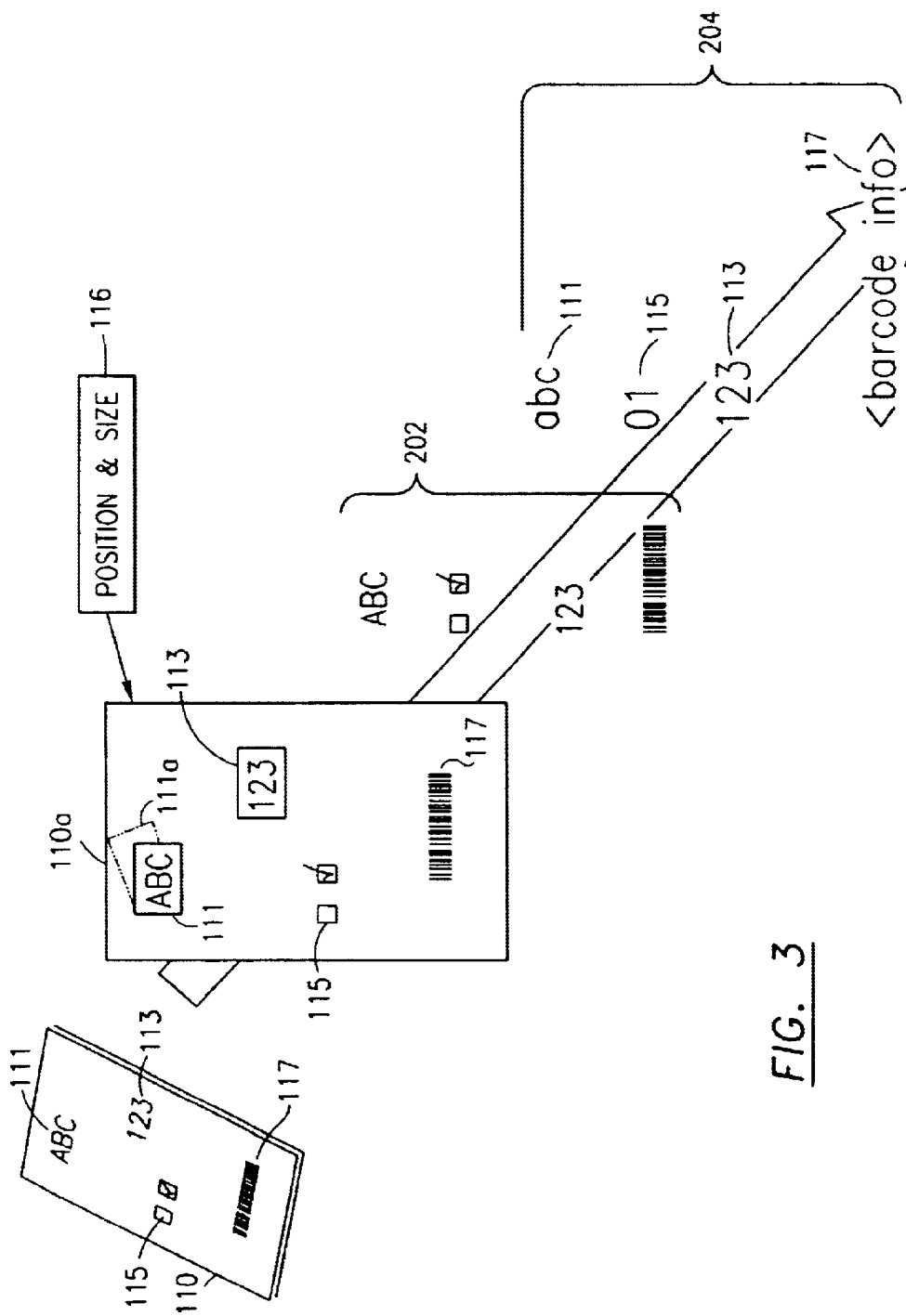
FIG. 3 diagrammatically illustrates the major processing steps for scanning an input document imprinted with data, locating the data, deciphering the data, and outputting the data as a delimited string of decoded characters.

FIG. 3 diagrammatically shows the processing of a document which has imprinted data thereon. In the illustrated embodiment, document 110 operates not only as the input form document (see FIG. 2) but also the input document carrying imprinted data thereon which will be scanned by system 10. Similar numerals designate similar items throughout the specification.

Input document 110 is fed into automatic document feeder and scanning mechanism 22 (FIG. 1) and feed control double and chain detector 24 determines the edges of the document. Deskewing and noise reduction unit 26 enables image registering unit 28 to rotate the scanned image of the document as necessary. Optionally, scanner system 10 can imprint bar codes, numbers, letters, pictures, etc. via optional imprinting unit 30 on the documents before they reach the paper out stage 32. Optional image output module 34 configures the scanned image (e.g., as a TIFF file) and optionally ads bar codes, numbers, letters, pictures, etc. to the image and sends that output to optional output port 17. The scanned image may be part of the delimited character string. After the scanned image has been rotated to the correct point, form processing unit 40 compares various field descriptors from stored forms in forms database 42 with the scanned document image. Most likely, positional information for selected data fields from each of the plurality of stored forms is compared against the scanned image. Upon a reasonable match between positional locations and data types in those locations, a single form is selected from the database. Further, if one data field such as data field 111 in FIG. 3 is rotated or askew, shown by broken lines 111a in FIG. 3, field extraction unit 46 realigns that data image field.

After one of the plurality of forms is selected, the data from each data field in the scanned document image is extracted via field extraction unit 46. In another words, the image from data fields 111, 113, 115 and 117 is extracted from scanned image document 110a. In data field recognition unit 48, each field is analyzed using a proper algorithm for each data type. As stated earlier, each data field has a plurality of data field descriptors which include positional information, size information and data type information. The data type information correlates the data field image with one library in the collection of recognition library sets. Some of those recognition sets are shown as recognition engines 50 in FIG. 1. For example, an OCR library decodes and deciphers alphanumeric and typographic symbols in a data field image.

After the data images in each data field have been decoded based on field recognition 48 and recognition engine 50, the data fields are configured in separate files or storage areas shown in steps 202 and 204 in FIG. 3. After recognition, shown in step 204 in FIG. 3, the optical checks in data field 115 have been converted from optical characters into digital format 01.

In data processing unit 60, each field undergoes a validation process if the operator has selected a data validation parameter during the input form sequence. For example, alphabetic fields may be subjected to a spell checker via a dictionary database 64. Mathematic or numeric data fields (see data fields 115 and 113) may be subject to mathematic algorithms. As an example of a numeric validation, the value in data field 115 must be either 01 or 10. It would be improper or an error if 00 were decoded or 11 were decoded indicating that the user who "checked the box" in data field 115 double checked the box or did not leave any optical marking in one of the two boxes. Logical check unit 68 enables the automatic check of these decoded data fields as established by the operator during creation of the form document.

Any error reports from field and rule checker unit 62 are supplied via control unit 80 to display 84. The operator at keyboard 86 may correct the error if the data correction field descriptor has been turn ON. If the operator is enabled to correct the data and does correct the error, summation module 64 substitutes the corrected data for the previously scanned and decoded incorrect data. Output step data formatting module 66 takes the individual files or data elements for fields 111, 115, 113 and 117 and puts them into a delimited string of decoded characters as shown by step 206. The string is output via port 15 to a further computer device. It should be appreciated that the further computer device can easily process this delimited string of decoded characters into a spreadsheet, database or any other type of word processing program.

The claims appended hereto are meant to cover modifications and changes within the scope and spirit of the present invention.

What is claimed is:

1. A method for scanning a document imprinted with data, locating the data and deciphering the data and outputting the data as a delimited string of decoded or calculated characters to a computer system via a common computer communications link, the method comprising:

one of (a) scanning a form document that is adapted to have imprinted thereon data in at least one data image field and obtaining positional information for said at least one data image field on said form document or (b) inputting a topological description for said at least one data image field for said form document, said topological description including positional information for said at least one data field;

identifying and storing data field descriptors for said at least one data field, said data field descriptors including said positional information and data field size information, data type information, the presence or absence of data validation parameters, the presence or absence of data error reporting and data correction, and data output destination information relative to said delimited string of decoded characters;

with respect to other form documents, repeating the steps of scanning said other form documents or inputting topological descriptions of said other form documents and repeating the steps of identifying and storing said data field descriptors for each said form;

scanning said document imprinted with data and capturing an image thereof as a scanned image;

comparing said scanned image with said stored data descriptors for said forms, and utilizing positional, data field size and data type information, selecting one form corresponding to said scanned image;

extracting data from said scanned image and decoding, calculating, or validating said data with a corresponding routine, based upon said data field descriptors and storing the decoded data;

reporting and correcting errors in the presence of said data error reporting and correction descriptor;

outputting said decoded data as said delimited string of decoded characters based upon said data output destination information.

2. The method as claimed in claim 1 including the steps of displaying data that does not pass the validating step in the extracting, decoding and validating process and accepting an operator input with corrected data.

3. A method as claimed in claim 2 wherein said document bearing imprinted data includes a plurality imprinted data in a plurality of data fields, the method including repeating said step of identifying and storing data field descriptors for each data field of said plurality of data fields and the step of outputting includes outputting a plurality of decoded and validated data corresponding to said plurality of data into said delimited string of decoded characters.

4. A method as claimed in claim 3 wherein said data type includes data types including printed letters, printed numbers, optical marks, optical tick marks, optical cross-out marks, handwritten characters, bar codes and special optical characters and the step of decoding includes ascertaining whether the extracted data matches a stored data type character set.

5. A method as claimed in claim 4 wherein the step of extracting data from said scanned image includes extracting field images from said scanned image, said field image containing data images and the step extracting includes the steps of deskewing and attenuating smudges in said data fields by noise reduction techniques.

6. A method as claimed in claim 5 wherein all the steps are carried out in a single machine.

7. A method as claimed in claim 1 wherein said document bearing imprinted data includes a plurality imprinted data in a plurality of data fields, the method including repeating said step of identifying and storing data field descriptors for each data field of said plurality of data fields and the step of outputting includes outputting a plurality of decoded and validated data corresponding to said plurality of data into said delimited string of decoded characters.

8. A method as claimed in claim 1 wherein said data type includes data types including printed letters, printed numbers, optical marks, optical tick marks, optical cross-out marks, handwritten characters, bar codes and special optical characters and the step of decoding includes ascertaining whether the extracted data matches a stored data type character set.

9. A method as claimed in claim 1 wherein the step of extracting data from said scanned image includes extracting field images from said scanned image, said field image containing data images and the step extracting includes the steps of deskewing and attenuating smudges in said data fields by noise reduction techniques.

10. A method as claimed in claim 1 wherein all the steps are carried out in a single machine.

11. A unitary, stand-alone system for scanning, extracting and decoding a document imprinted with data, based upon a plurality of form documents, each form document having at least one data image field therein, the system outputting the data as a delimited string of decoded or calculated characters to a further computer system via a common computer communications link, the system comprising:

a scanner for scanning said document imprinted with data and capturing an image thereof as a scanned image and for scanning said form document;

a form input system, coupled to said scanner, having means for obtaining positional information for said at least one data image field on some form documents of said plurality of form documents and means for inputting a topological description for said at least one data image field for other forms of said plurality of form documents, said topological description including positional information for said at least one data field;

means for identifying and storing data field descriptors for said at least one data field for each form document, said data field descriptors including said positional information and data field size information, data type information, the presence or absence of data validation parameters, the presence or absence of data error reporting and data correction, and data output destination information relative to said delimited string of decoded or calculated characters;

selection system for selecting one form of said plurality of form documents corresponding to said scanned image based upon a comparison of said scanned image with said stored data descriptors for said forms, and utilizing positional, data field size and data type information;

data extractor for obtaining data from said scanned image;

data decoder for decoding the scanned data, said data decoder having a data validator to ascertain data validity in the presence of data validation parameters;

data correction routine to correct errors in the decoded data in the presence of said data error reporting and correction descriptor;

compiler for outputting said decoded data as said delimited string of decoded characters based upon said data output destination information.

12. A system as claimed in claim 11 wherein the system includes an operator interface including a display system and a data and command input system, said means for identifying coupled to said operator interface, and said operator interface providing some data field descriptors such as data type information, data field size information, and data validation parameters.

13. A system as claimed in claim 12 wherein said data correction routine is coupled to said operator interface, said data correction routine displaying data errors on said display and said operator interface adapted to accept operator input via said data and command input system to correct said scanned and decoded data.

14. A system as claimed in claim 13 including a deskewing system to reposition said scanned data from said document and a noise reduction system to diminish the adverse affects of smudges on said document imprinted with data.

15. A system as claimed in claim 11 wherein said data correction routine is coupled to said operator interface, said data correction routine displaying data errors on said display and said operator interface adapted to accept operator input via said data and command input system to correct said scanned and decoded data.

16. A system as claimed in claim 11 including a deskewing system to reposition said scanned data from said document and a noise reduction system to diminish the adverse affects of smudges on said document imprinted with data.

* * * * *